US008023477B2

(12) United States Patent
Dosa et al.

(10) Patent No.: US 8,023,477 B2
(45) Date of Patent: Sep. 20, 2011

(54) MANAGING CONNECTIONS IN A WIRELESS COMMUNICATIONS NETWORK

(75) Inventors: Ferenc Dosa, Helsinki (FI); Johan Wikman, Helsinki (FI)

(73) Assignee: Nokia Corporation, Espoo (FI)

( * ) Notice: Subject to any disclaimer, the term of this patent is extended or adjusted under 35 U.S.C. 154(b) by 1334 days.

(21) Appl. No.: 11/432,547

(22) Filed: May 12, 2006

(65) Prior Publication Data

US 2007/0140193 A1     Jun. 21, 2007

(30) Foreign Application Priority Data

Dec. 21, 2005   (GB) .................................. 0526029.4

(51) Int. Cl.
*H04W 4/00* (2009.01)
*H04L 12/28* (2006.01)

(52) U.S. Cl. ................... 370/338; 370/395.52

(58) Field of Classification Search ................. 370/338, 370/351, 16, 346–7, 345, 445–8, 328, 310, 370/252, 469, 315, 241, 421, 216
See application file for complete search history.

(56) References Cited

U.S. PATENT DOCUMENTS

| 6,212,175 | B1 | 4/2001 | Harsch |
| 7,370,102 | B1* | 5/2008 | Chu et al. ...................... 709/223 |
| 7,472,194 | B2* | 12/2008 | Chandhok et al. ............ 709/227 |
| 7,480,280 | B2* | 1/2009 | Proctor, Jr. .................... 370/335 |
| 2004/0264381 | A1 | 12/2004 | Banerjee et al. |
| 2006/0018323 | A1* | 1/2006 | Kempe ..................... 370/395.21 |
| 2006/0159011 | A1* | 7/2006 | Dalal et al. .................... 370/220 |
| 2008/0317060 | A1* | 12/2008 | Balasaygun et al. .......... 370/437 |
| 2009/0017810 | A1* | 1/2009 | Harsch .......................... 455/418 |

OTHER PUBLICATIONS

International Search Report PCT/IB2006/002981 filed Oct. 12, 2006.
PCT Written Opinion for PCT/IB2006/002981 dated Oct. 12, 2006.

* cited by examiner

*Primary Examiner* — Melody Mehrpour
(74) *Attorney, Agent, or Firm* — Alston & Bird LLP

(57) ABSTRACT

A method of managing connections in a mobile communications network, the method comprising: transmitting over a connection from a network entity to a mobile device natural traffic and keepalive messages at a frequency determined by at least one keepalive parameter; at the mobile device, monitoring receipt of natural traffic and keepalive messages, and in the event of inadequate natural traffic and missing keepalive messages, closing the connection; and dynamically adjusting the at least one keepalive parameter for subsequent transmission of keepalive messages from the network entity so as to maintain the connection at a minimum frequency of keepalive messages.

24 Claims, 4 Drawing Sheets

MANAGING CONNECTIONS IN A WIRELESS COMMUNICATIONS NETWORK

FIELD OF THE INVENTION

The present invention relates to managing connections in a mobile communication network.

BACKGROUND TO THE INVENTION

In second generation (2G) and third generation (3G) wireless networks, mobile terminals (referred to herein as mobile devices) can in principle create regular transport control protocol (TCP)/internet protocol (IP) socket connections to servers on the internet. These connections are treated by the internet as though they are broadly similar to wired connections. However, connections in a wireless network have specific requirements which render them distinct from wired connections. The term "wireless network" used herein includes within its scope conventional cellular networks, and also any kind of network where at least one of the relevant connections is wireless whether cellular or not.

When considering use of the internet, client/server applications are very common and following the ability of mobile devices to create TCP/IP sockets, these kind of applications have become increasingly common in wireless networks as well. To date however, the most usual scenario is that the client is executed on the mobile terminal or device and the server is executed on a computer on the internet. In principle this does not create too much of a difficulty even in a wireless network, because the nature of a client application is normally that it will send a message that demand a response after which it is happy for the connection to remain quiescent until it needs to send another message. Management of connections of this type can be handled using existing mobile device technology.

However, there is a trend in mobile computing to put web servers/web services (or any kind of other services/servers) on the mobile devices themselves and make them accessible to the public internet. In a fixed network environment, the only problem to solve is that of running the server on the mobile device. In a wireless environment however, a TCP/IP connection behaves differently than it does in a fixed network. One reason for this is that network operators optimise and fine tune their network settings, and this often involves connections with very infrequent traffic becoming unreliable. In such as case, the internet end may send a packet and not receive any notification about it having been delivered, and the mobile end may not receive the packet either. At the moment, operators are able to perform such optimisation because the most widespread use of wireless TCP/IP connections consist almost entirely of the mobile end being the client, and therefore the connections being short lived (and managed at the mobile end).

However, when implementing a server or other kind of application on the mobile end which requires to be accessible at all times, there is a need to provide a connectivity solution to avoid the problem that idle connections—that is, connections that have been successfully created and used but over which no traffic has occurred for some period of time, go stale. This staleness may not manifest itself either to the mobile end or the internet end, with the effect that they remain totally unaware that data send over that connection has not reached the other end. Clearly when this happens the system does not work in its intended way.

It is a requirement therefore to minimise the effect of stale connections in a wireless network. This can be done by transmitting keepalive messages from the internet end to the mobile end on a regular basis. However, this has implications. Keeping a connection alive is costly, both in terms of battery consumption at the mobile end and network traffic. Therefore, it is not desirable to transmit keepalive messages too frequently in the case where less infrequent keepalive messages would still maintain the connection open when necessary.

It is a first aim of the present invention to allow for maintenance of a connection using keepalive messages without unnecessarily straining the battery consumption or network traffic requirements.

Another associated problem is that operators use different cellular settings for managing traffic connections. Moreover, the same operator may have different network settings in different cells. It is also possible that some cells simply have broken settings—that is they have a completely different characteristic to other cells. This further complicates the management of the transmission of keepalive messages because, even once set for a particular situation, they may well need to be altered to take into account differing operator settings.

It is therefore a second aim of aspects of the invention to solve this problem.

SUMMARY OF THE INVENTION

According to an aspect of the present invention there is provided a method of managing connections in a mobile communications network, the method comprising:

transmitting over a connection from a network entity to a mobile device natural traffic and keepalive messages at a frequency determined by at least one keepalive parameter;

at the mobile device, monitoring receipt of natural traffic and keepalive messages, and in the event of inadequate natural traffic and missing keepalive messages, closing the connection; and dynamically adjusting the at least one keepalive parameter for subsequent transmission of keepalive messages from the network entity so as to maintain the connection at a minimum frequency of keepalive messages.

It will be understood from the following that the minimum frequency is in fact an optimal or near optimal frequency which maintains a connection but which reduces to a minimum the cost of the connection in terms of battery usage and network traffic.

The keepalive parameter can be, for example, an interval between keepalive messages or a maximum latency. The minimum frequency relates to the maximum feasible interval depending on network settings, dynamic contexts such as wireless signal strength and traffic patterns.

Another aspect of the invention provides a network entity for use in a mobile communications network, the network entity comprising:

means for establishing a connection with a mobile device;

means for transmitting over the connection keepalive messages at a frequency determined by at least one keepalive parameter; and dynamically adjusting the at least one keepalive parameter for subsequent transmission of keepalive messages from the network entity so as to maintain the connection at a minimum frequency of keepalive messages.

A further aspect of the invention provides a mobile device for use in a mobile communications network, the mobile device comprising:

means for establishing a connection with a network entity;

means for receiving over said connection natural traffic and keepalive messages at a frequency determined by at least one keepalive parameter;

means for monitoring receipt of the natural traffic and keepalive messages and in the event of inadequate natural traffic and missing keepalive messages closing the connection; and means for transmitting to a network entity information identifying a new parameter for subsequent transmission of keepalive messages.

A wireless communications network implementing the above-defined method is also provided. This aspect provides a communications network providing a connection between a mobile device and a network entity, at least a portion of which is provided by a wireless channel, wherein the network entity comprises:

means for transmitting natural traffic and keepalive messages to the mobile device, the keepalive messages being at a frequency determined by at least one keepalive parameter, and means for dynamically adjusting the at least one keepalive parameter for subsequent transmission of keepalive messages so as to maintain the connection at a minimum frequency of keepalive messages; and wherein the mobile device comprises monitoring receipt of natural traffic and keepalive messages, and in the event of inadequate natural traffic and missing keepalive messages operating to close the connection.

A further aspect of the invention provides a method of managing a connection in a network entity, the method comprising:

establishing a connection with a mobile device;

transmitting over the connection keepalive messages at a frequency determined by at least one keepalive parameter; and dynamically adjusting the at least one keepalive parameter for subsequent transmission of keepalive messages so as to maintain the connection at a minimum frequency of keepalive messages.

A further aspect of the invention provides a method of managing a connection at a mobile device comprising:

establishing a connection with a network entity in a mobile communications network;

receiving over said connection natural traffic and keepalive messages at a frequency determined by at least one keepalive parameter;

monitoring receipt of the natural traffic and keepalive messages and in the event of inadequate natural traffic and missing keepalive messages closing the connection; and transmitting to a network entity information identifying a new parameter for subsequent transmission of keepalive messages.

A further aspect of the invention provides a network entity for use in a mobile communications network, the network entity comprising:

an interface adapted to establish a connection with a mobile device via the mobile communications network;

a processor arranged to transmit over the connection keepalive messages at a frequency determined by at least one keepalive parameter;

said processor being operable to dynamically adjust the at least one keepalive parameter for subsequent transmission of keepalive messages so as to maintain the connection at a minimum frequency of keepalive messages.

A further aspect of the invention provides a mobile device for use in a mobile communications network, the mobile device comprising:

an interface adapted to establish a connection with a network entity in the mobile communications network;

a receiver adapted to receive over said connection natural traffic and keepalive messages at a frequency determined by at least one keepalive parameter; and a processor arranged to monitor receipt of the natural traffic and keepalive messages and in the event of inadequate natural traffic and missing keepalive messages arranged to close the connection; and a transmitter arranged to transmit to a network entity information identifying a new parameter for subsequent transmission of keepalive messages.

Computer program products are also provided which comprise program code means for implementing the above defined method at the mobile device and network entity respectively.

Two different embodiments of the invention are discussed in the following. In these embodiments, the network entity is an internet end, commonly an internet server, while the mobile device is a mobile station executing software which can be browser or webserver software. In both embodiments, in order to keep the connection alive, the server sends regular keepalive messages if no "natural" (payload) traffic occurs. The periodicity (interval) of the keepalive messages is adjusted between the mobile end and the internet end so that they occur frequently enough to keep the connection alive yet as rarely as possible not to stress the battery more than necessary.

In the first embodiment, management of the keepalive message interval is implemented at the mobile end, which advises the internet end of the new required interval.

In the second embodiment, management of the keepalive connection is implemented as part of keepalive settings including the interval and a maximum latency and is managed at the internet end. Both embodiments allow an optimal frequency for keepalive messages to be established, taking into account battery consumption, network traffic and the requirement to avoid unnecessary breaking and re-establishing connections.

For a better understanding of the present invention and to show how the same may be carried into effect, reference will now be made by way of example to the accompanying drawings.

DESCRIPTION OF THE PREFERRED EMBODIMENT

Figure 1:
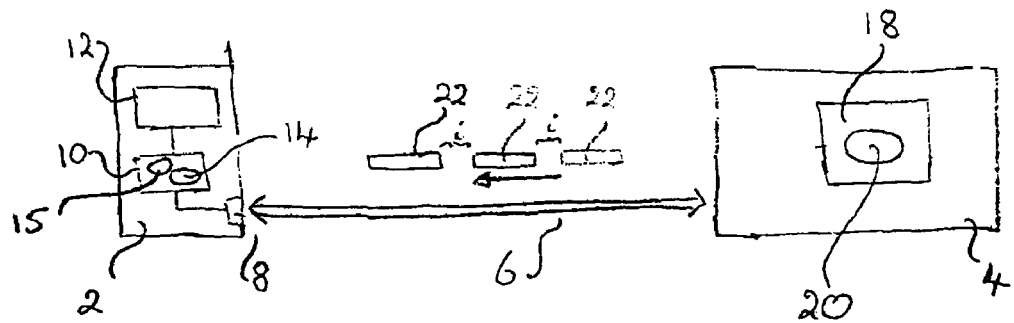
FIGS. 1 and 1A are schematic diagrams illustrating a mobile end and an internet end communicating over a wireless communications network.
Figure 1A:
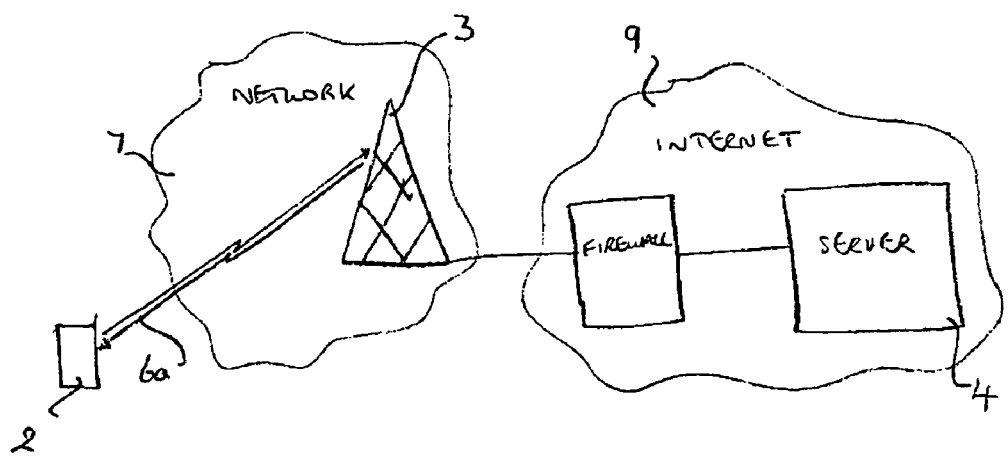

FIGS. 1 and 1A are schematic diagrams illustrating the context of the present invention. A mobile station MS 2 is in communication with an internet server 4 over a bidirectional communication path (connection) 6 established over a wireless network 7 and a public network such as the internet 9 (see FIG. 1A). The mobile station MS can be any mobile device including mobile phones, personal digital assistants (PDAs) or other mobile devices. Likewise, the internet server can be any type of internet device.

The mobile station 2 includes an RF interface 8 for establishment of a wireless channel 6a with a base station 3. It also has a processor 10 and a user interface 12 including a display and a keyboard. The processor 10 controls the operation of the mobile station 2 but of importance in the present context executes programs referred to generally herein as software 14,15 which can control operation of the MS 2 or a client at one protocol layer (15) and provide webserver applications as another protocol layer (14). That is, as is known in the art, internet communication with a mobile station involves a layered architecture in which a protocol provides a number of different networking layers. The mobile station can have different roles depending on the networking layer. Considering the transport (TCP) and session layers of the protocol, the mobile station 2 acts as a client and the internet server 4 acts as a server. However, considering the application layer (web, http protocol), in the case where the mobile station is providing web server applications, the mobile station acts as the server and any browser provided on the internet acts as the client.

In the case of peer to peer computing (like for example instant messaging applications running on two mobile phones, or on one mobile phone and a personal computer (PC), once again considering the transport (TCP) and session layer, the mobile station acts as the client and the internet server acts as the server. Once again, in the application layer (in this case the instant messaging protocol), the mobile station is a peer and the other party is another peer.

The present application is predominantly concerned with the establishment of a connection involving keepalive messages which are established as a protocol in the session layer. Therefore, in the present application, the mobile station 2 will be referred to herein as a client, and the aspects of the software 14 which will be discussed are those which control operation of the mobile station 2 as a client and in particular its management of keepalive messages. Nevertheless, it will be appreciated that a principle application of the present invention is when the mobile station is performing (in the application layer) a more server-like function, for example a web server.

In particular, the described embodiments of the invention are useful in situation where applications executed on a mobile station have to be truly accessible to the public internet, meaning that actions originated from the internet must always end up on the mobile station. To summarise, from keepalive connection protocol point of view, the mobile station is a client and the internet server is server, while from an application protocol (such as webbrowsing (or instant messaging)) point of view, the mobile station is a server (or peer) and any webbrowser (or other instant messaging peer instance) is a client (or peer). A mobile web server in a wireless environment is truly a passive element which has to timely respond to HTTP requests originated from the internet. Any long delays or connectivity downtimes are painfully visible to users.

The internet server 4 is shown having a processor 18. Of relevance in the present context, the processor 18 executes connectivity management software 20 which cooperates with the mobile station 2 to ensure correct operation of connections over which application data (traffic) is conveyed.

A connection is established for traffic between the internet server 4 and the mobile station 2 to allow for internet applications to be executed on the mobile station 2. In order to keep the connection alive, the server sends regular keepalive messages 22, which are shown diagrammatically in FIG. 1, if no "natural" traffic occurs. Periodicity of the keepalive messages 22 is governed by the interval i with which they are sent from the server 4 to the mobile station 2. In the following described embodiments, the periodicity (i) of the keepalive messages 22 is dynamically adjusted so that they occur at a minimum required interval, that is frequently enough to keep the connection alive, yet as rarely as possible so as not to cause undue costs (particularly in terms of battery, network traffic) more than necessary.

Figure 2:
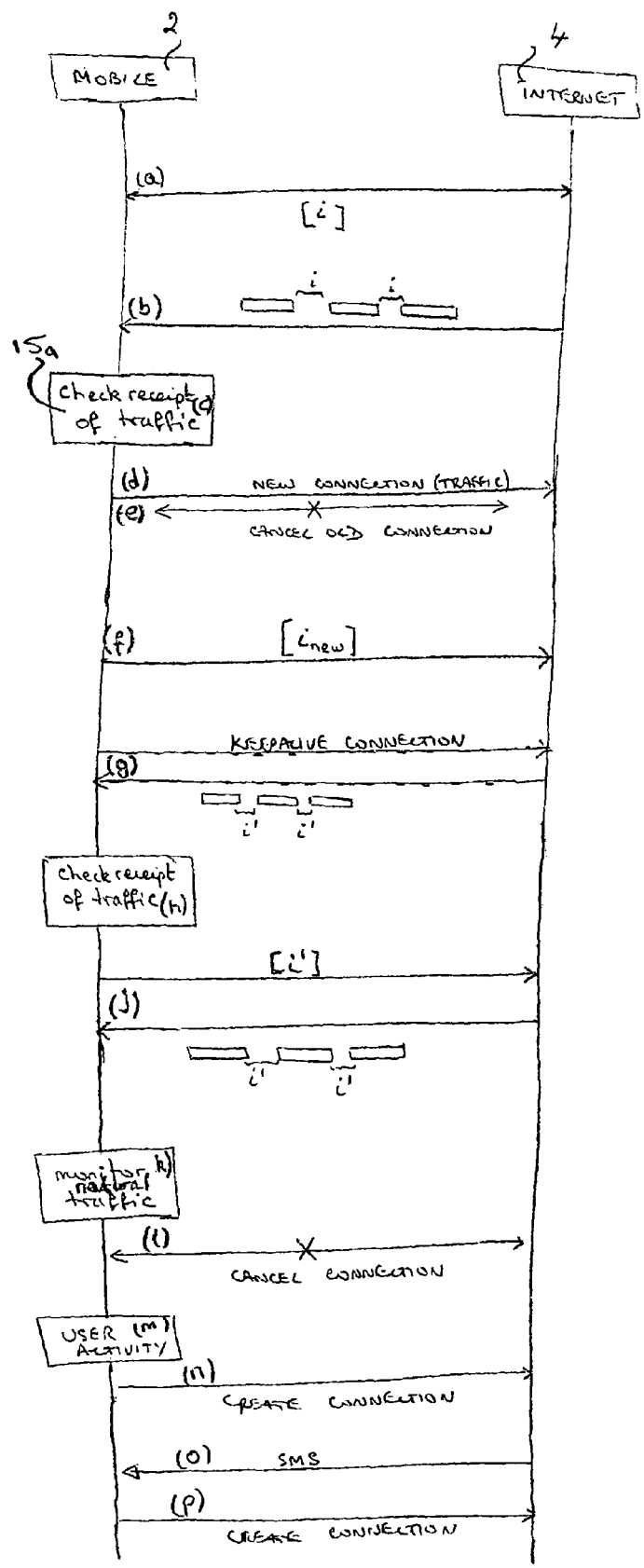
FIG. 2 illustrates the message exchange in a first embodiment of the invention.

Reference will now be made to FIG. 2 to discuss a first embodiment of the invention. FIG. 2 shows the exchange of traffic between the mobile station 2 and the internet server 4 over the connection 6. References to the client herein refer to the client application software 14 (which may, as already mentioned, not be a true client but could be more of the nature of an element that can be asynchronously invoked from the application concept point of view). The processor 10 also implements a connection management program 15 which is responsible for executing the actions described in the following.

(a) When the client goes on-line, that is connects to the server, it transmits a keepalive period i (seconds) to the server. That period is either the last used period or some default, in case the client has not been connected to the server before.
(b) Unless there is "naturally" occurring traffic—that is, traffic related to the application specific protocol used between the client and the server—the server generates a keepalive message every i seconds.
(c) If the client does not receive any traffic (monitored by block 15a forming part of the program 15)—that is, traffic related to the application specific protocol, or the keepalive message—for i+m (where m is maximum allowed network latency) seconds, it assumes the connection has gone stale.
(d) In that case, the client creates a new connection to the server.
(e) During the initial handshake enough information is passed to allow the server to identify the new connection as being a replacement for a stale one. Consequently, the server closes the old connection.
(f) The client also instructs the server to make inew=r*i, where r is less than 1. The client may also decide to use a different m parameter, too. Thus, the length of the keepalive period is dynamically and automatically adjusted downwards to ensure that the next connection survives longer.
(g) Meanwhile, regularly with a period M>>i, the client opens a separate connection (keepalive connection shown with a broken line) to the server over which only keepalive messages are sent with a period i'>i.
(h) If that i' is deemed sufficient for keeping the connection alive, then (j) both client and server switch to i=i' on the actual connection.
Thus, the length of the keepalive period is dynamically and automatically adjusted upwards as needed.

Figure 3:
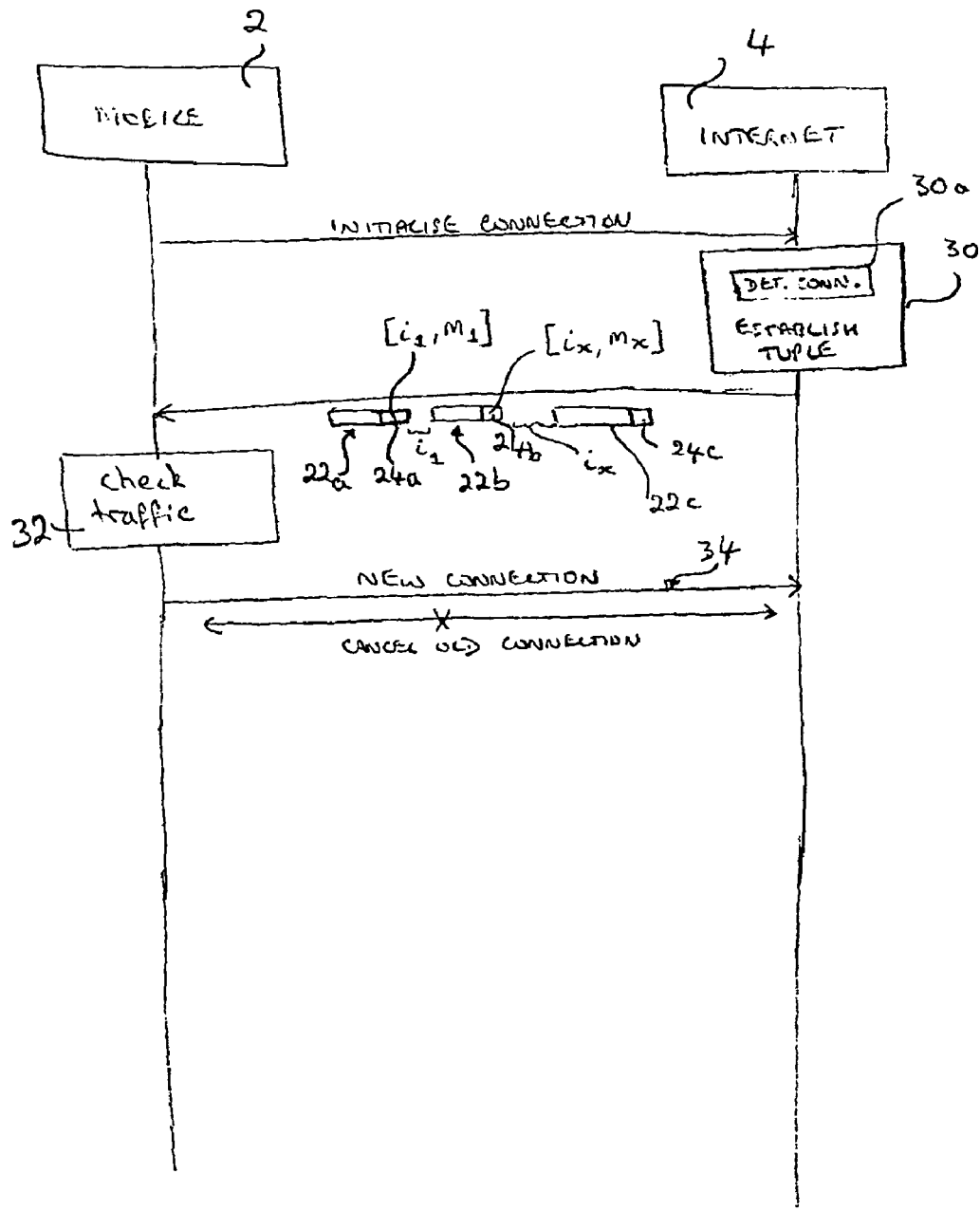
FIG. 3 illustrates the principles of message exchange in a second embodiment of the invention.

Reference will now be made to FIG. 3 to describe a second embodiment of the present invention. In the embodiment of FIG. 3, the internet server 4 determines the parameters for dispatching and monitoring keepalive messages. In this embodiment, the server 4 is referred to as the internet end and the mobile station 2 is referred to as the mobile end.

A tuple is used to represent the settings of a keepalive [i,m], where i is the interval in seconds between regular keepalive messages 22 sent from the internet end 4 to the mobile end 2, and m is the maximum latency. If a tuple (i,m) is agreed between the two endpoints, then it means that the internet end has promised to send a keepalive message at every i seconds, and the mobile end should be able to read such a keepalive message at most i+m seconds after the previously received keepalive message (or natural traffic (payload)). In this embodiment a tuple 24 is sent with each keepalive message 22, and is established by a connectivity management function block 30 at the internet end. A first tuple 24a is sent in a first keepalive message 22a with settings [$i_1$, $m_1$].

The mobile station 2 includes a block 32 for monitoring traffic ("natural" and keepalive). The block 32 has a function which resembles but is not identical to the program 15 in the first embodiment. If the mobile end cannot read anything after the last message in i+m seconds, then it will consider the connection broken and takes steps to re-initiate the connectivity. A new connection 34 is created from the mobile end to the internet end and the old (broken) connection is discarded.

The internet server 4 then re-establishes the tuple at block 30. First, it must determine, at block 30a (which forms part of the connectivity management function) the reason for establishment of the connection (initialisation or determination of a new connection for reasons of a broken old connection). This is discussed more fully in the following. The newly established tuple 24b is sent in the next keepalive message 22b with settings [$i_x$, $m_x$] and this alters the interval between that the subsequent keepalive message 22c to the new interval value $i_x$.

The two important principles underlying the second embodiment are that the same connection that is used by the application can be used to discover optimal keepalive settings—there is no need for extra connections as in the first embodiment, and also that, if necessary, the tuple can be reset at each keepalive message. Of course, it is not necessarily reset at every keepalive message, as discussed more fully in the following, but that level of flexibility remains available.

For this, the mobile end must be able to dynamically apply a new tuple at every keepalive. That is, not only after the initial connection setup the (i,m) tuple will be agreed between the internet and mobile end, but the internet end should be able to define a new (i,m) tuple in every keepalive message it sends, which then has to be taken into account by the mobile end. This is handled at the function block 32. Because the connectivity protocol allows the resetting of the keepalive tuple not only at connection setup but also dynamically, in any keepalive message, then all sorts of keepalive discovery strategies and algorithms are possible by the internet end. This is practically useful in case such discovery strategies have to be fine tuned, and is indispensable in an application where the internet end is a gateway or server machine, and thus better discovery strategies can be applied by simply modifying one central piece instead of having to force a lot of mobile devices to upgrade software.

As stated above, the aim is to keep the connectivity alive/stable for as high percent of the time it needs to be as possible, while keeping the battery/traffic cost as low as possible—and do this while assuming nothing of the operator networks up front.

Having a low i (keepalives sent frequently) means safer connectivity, but it is very costly. For example, a five seconds interval in keepalive wears down a fully charged phone battery in four-five hours, while a 180 seconds interval did not manage to show any change in the battery charge even after eight hours in the same phone.

The latency (m) can vary basically for three reasons—and in fact all of these contribute to the latency perceived by the mobile end:

The internet end has to keep the runtime scheduling constraints—if the internet end is a server or a gateway, then the load on that end will obviously have effects on how well it can keep its promise to send those keepalives regularly.

The internet networking between the internet endpoint and the operator's network.

The operator's network infrastructure, including the air interface.

Having high m means that much greater variance of delays are tolerated by the mobile end—a connection may not actually be broken/stale, the keepalive message may have just missed the deadline. So high m value means a more tolerant setting, and lower m means stricter, more demanding requirements. But one does not want generously high m values either: if the maximum allowed latency is too high, then it simply means that connections are noticed too late to be truly broken/stale, and hence the reliability of the whole connectivity suffers.

This means that an (i,m) tuple with low i and high m is safer and more tolerant, while with high i and low m it is more risky, more optimal and earlier recognised as broken. A tuple t1=(i1,m1) is said to be more relaxed than a tuple t2=(i2,m2) of i1>i2 or i1=i2 but m1>m2. A tuple t1 is tighter than t2 if it is neither more relaxed than t2 nor equivalent to it.

Before describing a particular discovery strategy that can be implemented to establish tuples, reference will be made to FIG. 4 which schematically illustrates hardware and software which can be implemented at the internet end to allow the above connectivity management function to be implemented.

The processor 18 executes a set of programs, some of which implement the connectivity management function discussed herein. The programs which are discussed more fully herein are a program P1 for detecting the nature of established connections, a program P2 for transmitting keepalive messages and a program P3 for computing tuples. In this sense, the combination of the processor 18 and the program P1 can be considered to implement the functional block 30a of FIG. 3. The combination of the processor 18 and the program P3 can be considered to implement the functional block 30 in FIG. 3. Of course, other implementations of these functional blocks in either hardware or software are possible.

The internet end includes a store 44 for holding the current tuple which is being used for the transmission of current keepalive messages. When the tuple is changed, this store is updated. In addition, there is a store 50 for holding the state of the connection as discussed more fully below. A database 40 holds prior established or default tuples for individual mobile devices. A second database 52 can be used for holding optimal tuples as discussed later. The circuitry of FIG. 4 allows a connectivity algorithm to be implemented which tries to establish an optimal (the tightest possible) tuple starting from the safest (most related) tuple. In particular the main part of this algorithm is implemented in the compute tuple process P3.

Figure 4:
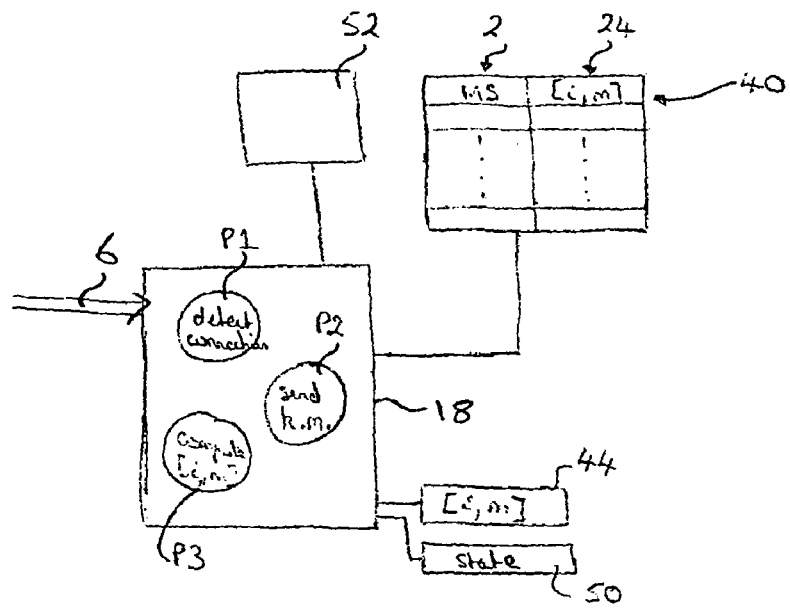
FIG. 4 is a schematic block diagram of circuitry at the internet end in the second embodiment of the invention.

The internet end starts off with a unique tuple (i,m) for each mobile end to which it can be connected—this is to make sure that each mobile has a connection that is optimised for it (see store 40 in FIG. 4). There are two main states that a connection can have: it can be in the "still tinkering with the settings" mode, i.e. "discovering" state, or it can be in the "I've already found the optimal settings" or "settled" state. This is held in a local state store 50.

The internet end will have to consider recomputing (P3) the interval and maximum latency values for a connection in the following events:

First connection establishment—a mobile end just connected, initiated by some user action.

Reconnection (in order to repair connectivity after an old connection was deemed broken/stale) by the mobile end.

A keepalive message is about to be sent to the mobile end.

The internet processor 18 executes a process P1 to convey the information whether a mobile end is connecting because of a user action or reconnecting automatically to repair lost connectivity. While this information can be partly figured out by the internet end, it is readily available at the mobile end, and thus a simple solution is to have the connectivity protocol allow the mobile end—upon connection establishing—to tell it to the internet end.

In the case of first connection establishment, the algorithm P3 initialises the tuple for the given mobile end/connection with the most relaxed settings allowed (from store 40), and sets the state of the connection to "discovering" (in local store 50).

In the case of reconnection, the algorithm P3 has to relax the tuple if it was in a "discovering" mode, or leave it intact if it was in a "settled" state. But since the purpose of reconnection is to be able to trigger recalibration of the settings if necessary, the internet end must leave the "settled" state, and set it to "discovery" regardless of what state it was in. This means that if the mobile end is in a less reliable cell/environment, then two reconnections can force a "settled" connectivity to start re-discovering. Moreover, relaxing a tuple may mean just selecting a tuple which is slightly more relaxed, but it may also mean that the most relaxed setting is chosen, i.e. "starting from scratch". When there are too many reconnections in quick succession it means that the tuples found so far are no good for one reason or another, and so it is just best to start from scratch.

In the case of sending the keepalive (P2), the internet end considers changing the tuple only if it is in the "discovering" state—"settled" state, by definition, means that the internet end is not to alter the settings—at least for a while. Basically, the internet end can tighten the tuple before the keepalive message is sent (with the possibly new (i,m) tuple). Before the internet end changes a tuple for a connection, it must make sure that the current settings used are viable. One way to do that is enable the protocol to convey the "last-known-good-settings" from the mobile end to the internet end during reconnection. Another way is if the internet end always sends enough keepalive with the same settings, and thus make sure that it only changes the settings if they are safe to be considered viable. For example, the number of keepalive messages sent before changing the tuple for a connection is computed as:

$$\max\{\lceil (m+i)/i \rceil, K\}$$

where K is the number of minimal keepalives to be sent (regardless of the current i, and m values). The notation $\lceil x \rceil$ is used to denote the smallest integer that is not smaller than x, e.g. $\lceil 2 \rceil=2$, $\lceil 2.5 \rceil=3$. The rationale behind the (m+i)/i part is that since the mobile end tolerates delays up to m seconds, it will not try to reconnect for m seconds after the first keepalive was due in i seconds. That means, that from the moment the current tuple (i,m) was adopted, there can be m+i seconds before the mobile end will try to reconnect due to lost connection. That is, the internet end will have to keep sending (m+i)/i keepalive messages, and only after that it can expect a reconnection when the connection was lost.

There can be many different heuristics and fine tuned behaviour applied to the interned end. For example, it could collect per-cell information and store it in a database 52 holding optimal tuples. That means when a connection is made by a mobile end it can use it's pre-knowledge and start from a possibly significantly tighter (i.e. optimal) tuple than the most relaxed one. This is beneficial only if the settings for cells vary greatly—if most cells behave the same way, then the characteristics of a connectivity will greatly depend on the time of the day/day of the week (overall cell traffic patterns) and the distance from the base station/strength of the signal.

Also, on (re)connections, the mobile end can identify the cell identity—not for storing a per-cell based tuple, but simply to allow the internet end to deduce if a connection break was due to network handover or for a different reason.

As indicated above, the internet end normally does not adjust the tuple of a settled connection. However, there should be a driving force that unsettles the tuple from time to time—the less optimal (more relaxed) the connection is, the more frequently it unsettles the connectivity and makes it enter the "discovering" state. This is because one does not want a connection to be stuck in a state where once settings were deemed optimal, but since then it could have been made more optimal.

The operation of relaxing and tightening a tuple is implementation specific, but for example, it can mean the following: tightening means multiplying the interval by a factor greater than 1 until the max interval is reached or the connection is broken, and then by dividing the maximum latency with a divisor greater than 1 until the minimal maximum latency is reached. The factor/divisor can be 2 or the reciprocal of the golden ratio ($\approx 1.618$) or any suitable value, or it can be increased/decreased by adding/subtracting a suitable constant, too.

As pointed out above, a protocol that allows resetting the tuple (i,m) at every single keepalive empowers the internet end to have its discovering algorithm upgraded, or its parameters fine tuned without ever touching the mobile end—that degree of flexibility is built in to the system.

Compared to the first embodiment, only one connection is used—no secondary/discovering connection are ever needed, which makes the programming of both ends significantly easier. In the second embodiment, the optimal settings can be discovered by pushing them to their limit, that is, by breaking them, and then taking a step back and apply the last known good value.

Also, in comparison to the first embodiment which has a lot of extra connections established and broken, the current approach will keep the connection alive most of the time and do the discovery at the same time.

A specific example follows for the second embodiment of the invention:

Connection—tuple (i,m) is agreed to be (3 seconds, 20 seconds)—3 seconds interval and 20 seconds maximum latency.

After some keepalives are successfully sent, the settings incrementally increase to, (180 sec, 20 sec), e.g. (6 sec, 20 sec), (12 sec, 20 sec), (24 sec, 20 sec), (48 sec, 20 sec), (96 sec, 20 sec), (180 sec, 20 sec)—assuming that the maximum interval is specified as 180 seconds. Having reached this (still the same connection), then the maximum latency is discovered by tightening (i.e. decreasing it): (180 sec, 15 sec), (180 sec, 10 sec), and if we assume that the minimal latency is 10 seconds, the tightest (=most optimal) setting (tuple (180 sec, 10 sec)) is reached without ever breaking any connection. If, however, the cell will not deliver keepalive messages with these settings, there will be at most two connection breaks: one when the interval has been pushed over its limits, and the second when the maximum latency has been too strict.

The invention claimed is:

1. A method comprising:
   causing transmission of natural traffic and keepalive messages over a connection from a network entity to a mobile device at a frequency determined by at least one keepalive parameter; and
   dynamically adjusting, using information relating to a channel used to transport the natural traffic and the keepalive messages, the at least one keepalive parameter for subsequent transmission of the keepalive messages from the network entity so as to maintain the connection at a minimum frequency of keepalive messages.

2. A method according to claim 1, wherein the keepalive parameter is an interval between the keepalive messages and wherein the information relating to the channel comprises information on at least one previous keepalive parameter that was compatible with the channel.

3. A method according to claim 2, further comprising:
   selecting a first interval when the connection is first established;
   causing establishment of a new connection when the connection has been closed; and
   selecting a second interval for transmission of the keepalive messages over the new connection.

4. A method according to claim 3, further comprising:
   causing transmission of the first and second intervals to the network entity.

5. A method according to claim 1, further comprising:
   causing establishment of an additional keepalive connection for conveying only keepalive messages being monitored to determine the minimum frequency of the keepalive messages.

6. A method according to claim 2, wherein the dynamically adjusting of the at least one keepalive parameter comprises reducing the interval (i) to a new interval (inew) where inew=r.i, where r is less than 1.

7. A method according to claim 1, wherein the dynamically adjusting of the at least one keepalive parameter is implemented.

8. A method according to claim 1, further comprising:
   establishing a tuple [i, m] of keepalive settings for the at least one keepalive parameter including an interval (i) between the keepalive messages and a maximum latency (m).

9. A method according to claim 8, further comprising:
   dynamically adjusting the maximum latency.

10. A method according to claim 8, further comprising:
    using a default tuple when the connection is first established.

11. A method according to claim 10, further comprising:
    selecting a new tuple when a new connection is made after the connection has been closed.

12. A method according to claim 10, further comprising:
    selecting a new tuple when a keepalive message is to be transmitted.

13. A method according to claim 8, further comprising:
    causing the tuple to be conveyed with a keepalive message.

14. An apparatus, comprising:
    means for causing establishment of a connection with a mobile device;
    means for causing transmission of keepalive messages over the connection at a frequency determined by at least one keepalive parameter; and
    means for dynamically adjusting, using information relating to a channel used to transport the natural traffic and the keepalive messages, the at least one keepalive parameter for subsequent transmission of the keepalive messages from the network entity so as to maintain the connection at a minimum frequency of keepalive messages.

15. An apparatus as claimed in claim 14, wherein the apparatus is caused to receive information from the mobile device identifying a required setting for the at least one keepalive parameter.

16. An apparatus as claimed in claim 14, wherein the apparatus is caused to execute a connectivity algorithm which determines keepalive settings or said at least one keepalive parameter.

17. An apparatus as claimed in claim 14, wherein said wherein the information relating to the channel comprises information on at least one previous keepalive parameter that was compatible with the channel.

18. An apparatus as claimed in claim 14, further comprising:
    an internet server.

19. A network, comprising:
    a network entity comprising at least one processor and at least one memory including computer program code, the at least one memory and the computer program code configured to, with the at least one processor, direct the network entity at least to:
    cause transmission of natural traffic and keepalive messages to a mobile device, the keepalive messages being at a frequency determined by at least one keepalive parameter, and
    dynamically adjust, using information relating to a channel used to transport the natural traffic and the keepalive messages, the at least one keepalive parameter for subsequent transmission of keepalive messages so as to maintain the connection at a minimum frequency of keepalive messages; and
    the mobile device comprising at least one processor and at least one memory including computer program code, the at least one memory and the computer program code configured to, with the at least one processor, direct the mobile device at least to:
    monitor receipt of the natural traffic and the keepalive messages, and cause the connection to be closed upon detection of inadequate natural traffic and missing keepalive messages.

20. A method comprising:
    causing establishment of a connection with a mobile device;
    causing transmission of keepalive messages over the connection at a frequency determined by at least one keepalive parameter; and
    dynamically adjusting, using information relating to a channel used to transport the natural traffic and the keepalive messages, the at least one keepalive parameter for subsequent transmission of the keepalive messages so as to maintain the connection at a minimum frequency of the keepalive messages.

21. A non-transitory computer readable medium having a computer program stored thereon, the computer program configured to cause an apparatus to:
    cause establishment of a connection with a mobile device;
    cause transmission of keepalive messages over the connection at a frequency determined by at least one keepalive parameter; and
    dynamically adjust, using information relating to a channel used to transport the natural traffic and the keepalive messages, the at least one keepalive parameter for subsequent transmission of the keepalive messages so as to maintain the connection at a minimum frequency of the keepalive messages.

22. An apparatus comprising at least one processor and at least one memory including computer program code, the at least one memory and the computer program code configured to, with the at least one processor, direct the apparatus at least to:

cause establishment of a connection with a mobile device via the mobile communications network;

cause transmission of keepalive messages over the connection at a frequency determined by at least one keepalive parameter; and dynamically adjust, using information relating to a channel used to transport the keepalive messages, the at least one keepalive parameter for subsequent transmission of the keepalive messages so as to maintain the connection at a minimum frequency of the keepalive messages.

23. The computer readable medium of claim 21, wherein the computer program is further configured to cause the apparatus to establish a tuple [i,m] of keepalive settings for the at least one keepalive parameter including an interval (i) between the keepalive messages and a maximum latency (m).

24. The computer readable medium of claim 23, wherein the computer program is further configured to cause the apparatus to dynamically adjust the maximum latency.

* * * * *